US 6,707,170 B2

(12) United States Patent
Fukaya

(10) Patent No.: US 6,707,170 B2
(45) Date of Patent: Mar. 16, 2004

(54) INVERTER TYPE GENERATOR

(75) Inventor: Mitsuo Fukaya, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 14 days.

(21) Appl. No.: 10/200,382

(22) Filed: Jul. 19, 2002

(65) Prior Publication Data

US 2003/0030416 A1 Feb. 13, 2003

(30) Foreign Application Priority Data

Jul. 19, 2001 (JP) ........................... 2001-220120
Aug. 23, 2001 (JP) ........................... 2001-252983

(51) Int. Cl.$^7$ ................................. H02P 9/30
(52) U.S. Cl. ................. 290/40 A; 290/40 C; 310/184; 322/28; 322/29
(58) Field of Search ............... 290/40 A, 40 C; 310/184; 322/28, 29

(56) References Cited

U.S. PATENT DOCUMENTS

| | | | | |
|---|---|---|---|---|
| 4,163,187 A | * | 7/1979 | Thomas | 322/29 |
| 4,456,870 A | * | 6/1984 | Rodari | 322/29 |
| 4,549,106 A | * | 10/1985 | Stroud | 310/184 |
| 4,654,577 A | * | 3/1987 | Howard | 322/28 |
| 5,012,781 A | | 5/1991 | Yokoyama et al. | |
| 5,258,700 A | | 11/1993 | Shimizu et al. | |
| 5,397,975 A | * | 3/1995 | Syverson | 322/46 |
| 5,432,383 A | * | 7/1995 | Kawamura | 290/14 |
| 6,018,200 A | | 1/2000 | Anderson et al. | |
| 6,326,702 B1 | * | 12/2001 | Yonekura et al. | 290/40 C |
| 6,563,246 B1 | * | 5/2003 | Kajiura et al. | 310/162 |
| 6,603,227 B2 | * | 8/2003 | Rose, Sr. | 310/74 |

FOREIGN PATENT DOCUMENTS

| | | | | |
|---|---|---|---|---|
| EP | 539982 A2 | * | 5/1993 | H02J/1/00 |
| EP | 561623 A2 | * | 9/1993 | H02P/9/30 |
| FR | 2674382 A1 | * | 9/1992 | H02J/7/24 |
| JP | 58049699 | | 5/1981 | |
| JP | 60-187721 | | 9/1985 | |
| JP | 80-257795 | | 12/1985 | |
| JP | 509637 A | * | 9/1991 | |
| JP | 6311713 A | * | 11/1994 | |
| JP | 10108427 A | * | 4/1998 | H02K/21/22 |
| JP | 2934675 | | 6/1999 | |
| JP | 2000-278998 | | 10/2000 | |
| JP | 2001-211695 | | 8/2001 | |
| WO | WO92263332 A1 | * | 5/1999 | |

* cited by examiner

Primary Examiner—Joseph Waks
(74) Attorney, Agent, or Firm—Knobbe, Martens, Olson & Bear, LLP

(57) ABSTRACT

An electronically controlled inverter type generator system driven by an engine includes first and second generating bodies that have respective first and second voltage generating characteristics in response to engine speed. The generator system selects the AC output from the first generating body when the engine is operated over a first range of engine speeds and selects the AC output from the second generating body when the engine is operated over a second range of engine speeds. The AC output from the selected generating body is rectified to a DC voltage, and the rectified DC voltage is converted to a controlled AC voltage. The use of two generating bodies enables the generator system to operate in an economy mode during normal load conditions and to be able to supply power to a greater load when needed.

14 Claims, 4 Drawing Sheets

INVERTER TYPE GENERATOR

PRIORITY INFORMATION

This application is based on and claims priority to Japanese Patent Application No. 2001-220120, filed on Jul. 19, 2001, and Japanese Patent Application No. 2001-252983, filed on Aug. 23, 2001, which are expressly incorporated by reference herein.

BACKGROUND OF THE INVENTION

1. Field of the Invention

The present invention relates generally to an inverter type generator using a compact, light weight alternator configuration, and more particularly relates to an inverter type generator that includes two generating bodies wherein a first generating body provides an AC output voltage and a lower power output during a low engine speed range and a second generating body provides an AC output voltage and a higher power output during a high engine speed range.

2. Brief Description of Related Art

Conventionally, engine-driven generators are designed to be able to deliver a maximum possible power rating even if such power is not used or is only used for a temporary amount of time. As a result, typical engine-driven generators incorporate high-power engines to operate high-capacity generating bodies, making the overall design large, uneconomical, and heavy.

Typically, such engine-driven generator designs operate a generating body at a high speed so that the generating body delivers its rated power output at all times, even though the rated power is not needed for most of the time. Such operation causes the engine to run at an unnecessarily high speed, causing unwanted noise, fuel consumption, increased exhaust emissions, and high operating temperatures.

Conventional engine-driven generator designs that provide occasional high output power are heavy, loud, and too large. Because of noise, high temperature and high emissions, such conventional high-power generator designs are not operator friendly. Therefore, there is a need for an operator friendly, lightweight, quiet, environmentally friendly engine-driven generator design that is able to deliver adequate power when required.

SUMMARY OF THE INVENTION

Compact, lightweight, quiet, economical, and environmentally friendly engine-driven generators promote functionality, savings, and successful operation. Such improved designs however pose a challenge of providing adequate power when needed.

One aspect of a preferred embodiment of the present invention is a compact, lightweight engine-driven generator that incorporates a small engine. A first generator provides a lower output power at a lower engine speed range, and a second generator provides a higher output power at a higher engine speed range. The reduced engine size in combination with the two generators causes less heat to be generated and results in fuel savings when generating the lower output power, while being able to produce higher output power when required.

Another aspect of a preferred embodiment of the present invention is the use of an economy switch to allow the operating engine to run at a decreased speed when a high load is not present to thereby produce less noise, provide improved fuel economy, and produce lower exhaust emissions.

BRIEF DESCRIPTION OF THE DRAWINGS

The foregoing features, aspects, and advantages of the present invention will now be described with reference to the drawings of the preferred embodiments that are intended to illustrate and not to limit the invention. The drawings comprise eight figures in which.

DETAILED DESCRIPTION OF THE PREFERRED EMBODIMENTS OF THE INVENTION

Figure 1:
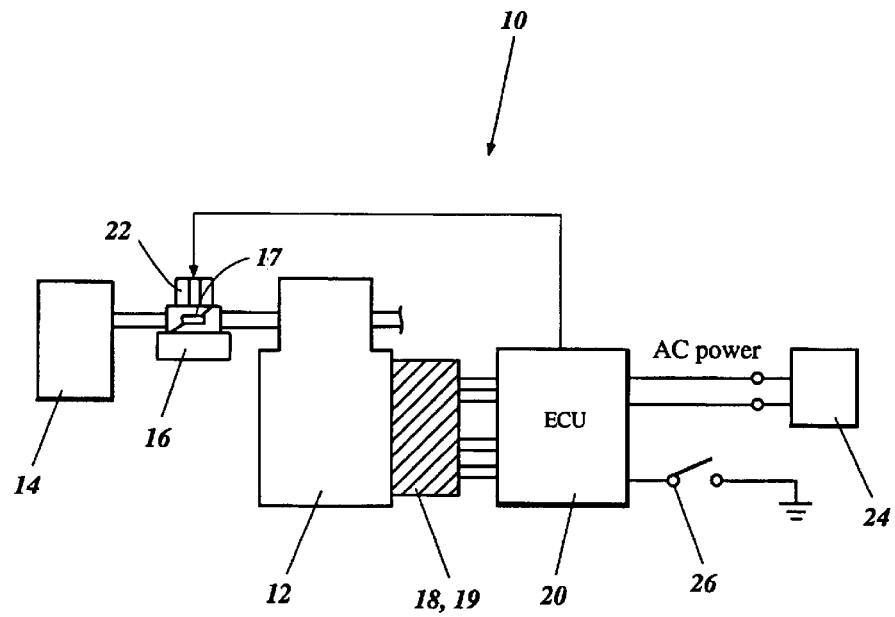
FIG. 1 is a schematic diagram of an engine-driven generator system that incorporates an electronic throttle to control the speed of the engine.
Figure 2:
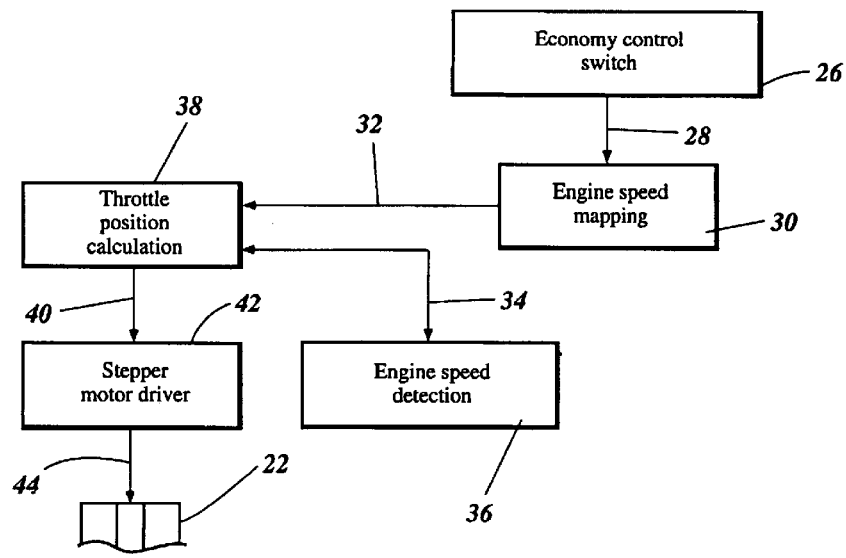
FIG. 2 is a schematic block diagram of the system that controls the electronic throttle.
Figure 3:
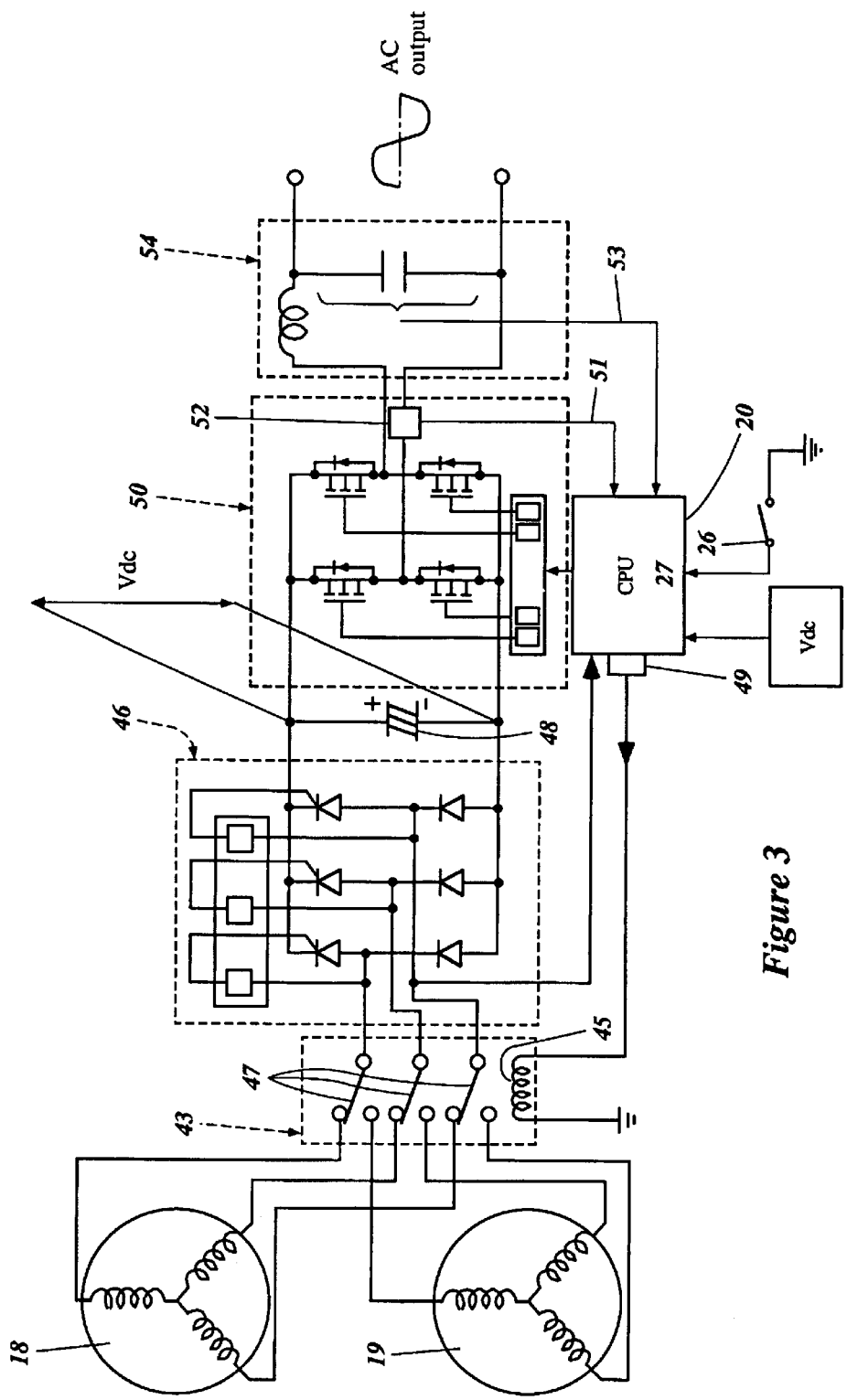
FIG. 3 is a schematic wiring diagram of a power generator that includes an electronic control unit and voltage conversion sections.

FIGS. 1 through 3 illustrate the overall configuration and the control of an engine-driven generator 10. An engine 12 is connected to an air filter 14 through a carburetor 16. The carburetor 16 receives fuel from a fuel source (not shown), and the speed of the engine 12 is controlled by a throttle 17 within the carburetor 16.

The engine 12 drives a first alternating current (AC) generator 18 and a second AC generator 19 which produce respective generated AC voltages (e.g., three-phase AC voltages). An electronic control unit (ECU) 20 receives signals responsive to the AC output voltage and current from the generator 10, and controls the AC output voltage from the generator 10 and also controls the throttle 17 in the carburetor 16 to control the speed of the engine 12. The control signals from the ECU 20 cause the generator 10 to deliver a regulated AC output voltage to provide power to various loads 24 connected to receive the AC output voltage.

The ECU 20 sends control signals to a stepper motor 22, which selectively opens and closes the throttle 17 of the carburetor 16 to control the speed of the engine 12.

An economy control switch 26 delivers a signal to a central processing unit (CPU) 27 within the ECU 20 to selectively cause the ECU 20 to control the speed of the engine 12 at a lower speed. Operating the engine at a lower speed when the economy switch 26 is closed reduces noise, increases fuel economy, and decreases emissions.

FIG. 2 schematically illustrates a control sequence within the ECU 20 that responds to a signal from the economy control switch 26 to send a signal to the stepper motor 22 to control the throttle 17 in the carburetor 16 to vary the engine speed. In particular, the economy control switch 26 provides an input signal 28 to an engine speed mapping function 30 that enables the CPU 27 to calculate a specific engine speed signal 32 from an engine speed map. The calculated engine speed signal 32 is applied to a throttle position calculation function 38, which compares the calculated engine speed signal 32 to an actual engine speed signal 34 from an engine speed detection function 36. The throttle position calculation function 38 determines a throttle angle required to operate the engine at the determined engine speed and sends a corresponding signal 40 to a stepper motor driver 42, which actuates the stepper motor 22 via a stepper motor driver signal 44.

FIG. 3 illustrates a schematic wiring diagram of the generator 10, including the first and second AC generator bodies 18, 19 driven by the engine 12 (FIG. 1) an AC-to-DC voltage conversion section 46, and a DC-to-AC voltage conversion section 50. The two voltage conversion sections 46, 50 and the speed of the engine 12 are controlled by the ECU 20 to cause the generator 10 to output an AC voltage at a controlled frequency and a controllable voltage.

The two power generator bodies 18, 19 are driven by the engine 12. The AC voltage generated by one of the two power generator bodies 18, 19 is selectively delivered to the AC-to-DC voltage conversion section 46, which, in the illustrated embodiment, comprises a rectifier (e.g., a full-wave bridge rectifier) 46. The AC voltage generated by one of the two generator bodies 18, 19 is selected by a relay circuit 43, which has a contact for each of the three phases of the AC voltage from each generator body 18, 19. A current is selectively applied to an exciter coil 45 within the relay circuit 43 to move a set of movable contacts 47 from the contacts connected to the phases of the first generator body 18 to the contacts connected to the phases of the second generator body 19. The contacts can also be wired so that the application of the current to the exciter coil 45 moves the movable contacts from the contacts connected to the phases of the second generator body 19 to the phases connected to the first generator body 18.

The exciter coil 45 is activated by the output of an intermediate circuit 49 that is controlled by the CPU 27. The intermediate circuit 49 converts an output signal from the CPU 27 to a signal at a voltage level and current level required by the exciter coil 45. Other switching circuits familiar to one of ordinary skill in the art, such as a hybrid switching circuit, can also be used instead of the relay circuit 43.

The rectifier 46 converts the generated AC voltage from the selected generator body 18 or 19 to a rectified DC voltage Vdc. The rectified DC voltage Vdc is applied across an electrolytic capacitor 48 to provide a stable DC voltage that is responsive to the speed of the engine 12.

The rectified DC voltage Vdc is delivered to the DC-to-AC voltage conversion section 50, which in the illustrated embodiment, comprises a DC-to-AC (DC/AC) converter 50. The DC/AC converter 50 is controlled by the ECU 20 to generate a specific an AC output voltage 53 at a controlled frequency and a controllable voltage. For example, the AC voltage 53 may be generated at 110 volts and 60 hertz for the United States and may be generated at 240 volts and 50 hertz for Europe. Other voltage and frequency combinations may also be generated.

The AC output voltage 53 cause an AC current to be delivered to a load 24 (FIG. 1). The AC current is sensed by a current sensor 52 that generates a sensed output current signal 51. The sensed output current signal, a signal representing the DC voltage Vdc, and a signal representing the AC output voltage 53 are provided as input signals to the CPU 27. The CPU 27 also receives an output signal from the economy switch 26.

The CPU 27 is responsive to the input signals to control the DC/AC converter 50 to provide the AC output voltage at the controlled frequency and at a controllable voltage (e.g., at 110 volts, 60 hertz, or at 240 volts, 50 hertz, or the like). A filter 54 eliminates high harmonic noise from the AC output voltage to provide a clean, accurate AC voltage at the voltage and frequency required by the load 24.

The magnitude of the power required by the load 24 is determined from the DC voltage Vdc, the output AC voltage 53 from the filter 54, and the sensed alternating current 51 from the current sensor 52. The signals representing the DC voltage Vdc, the AC output voltage value 53 and the measured alternating current 51 are delivered to the CPU 27 to allow the CPU 27 to control the DC/AC converter 50, as discussed above.

Figure 4:
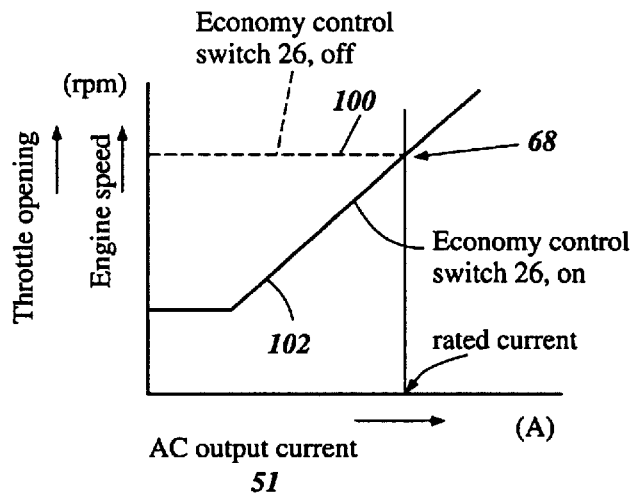
FIG. 4 is a graph of engine speed as a function of an AC output current that illustrates the operation of the engine-driven generator in response to control signals from an economy control switch.

The throttle valve stepper motor driver 42 is controlled in response to the position of the economy switch 26 in accordance with the graph in FIG. 4, which shows the relationship of the engine speed and the sensed AC output current, as represented by the sensed current signal 51. A dashed line 100 represents the relationship between the engine speed and the output current when the economy switch 26 is in the open (off) position. As illustrated, the throttle valve position and the resulting engine speed are constant. This predetermined constant engine speed pertains to a rated alternating current allowing the engine-powered generator 10 to deliver maximum power to the load 24.

When the economy switch 26 is in the closed (on) position, the stepper motor driver 42 controls the throttle valve position to lower the engine speed, as illustrated by horizontal left-most portion of a solid line 102 in FIG. 4. The stepper motor driver 42 is controlled by the ECU 20 to raise the engine speed to increase the available AC output current as the load 24 requires more power, as represented by the sloped right-most portion of the solid line 102. Keeping the engine speed low when a less than rated alternating current is requested allows the engine to operate quieter, more economically, and more environmentally friendly. When the load increases, the speed of the engine 12 is increased to increase the generator output current until the rated AC current is generated, as represented by a point 68 in FIG. 4.

Figure 5:
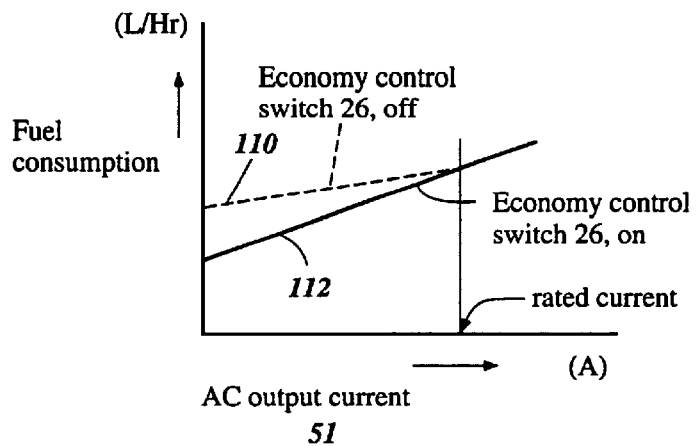
FIG. 5 is a graph of fuel consumption as a function of AC output current that illustrates the operation of the engine-driven generator in response to a control signal from an economy control switch.

FIG. 5 illustrates the relationship of fuel consumption to the AC output current. When the economy switch 26 is in the open (off) position, as represented by a dashed line 110, the overall fuel consumption is higher. This higher fuel consumption is caused by the engine 12 operating at a constant high speed. This constant high speed allows the power generator to output high power even when the load 24 does not require such high power. When the economy switch 26 is in the closed (on) position, the stepper motor driver 42 controls the throttle 17 to operate the engine at a lower speed to lower the fuel consumption, as represented by a solid line 112.

Figure 6:
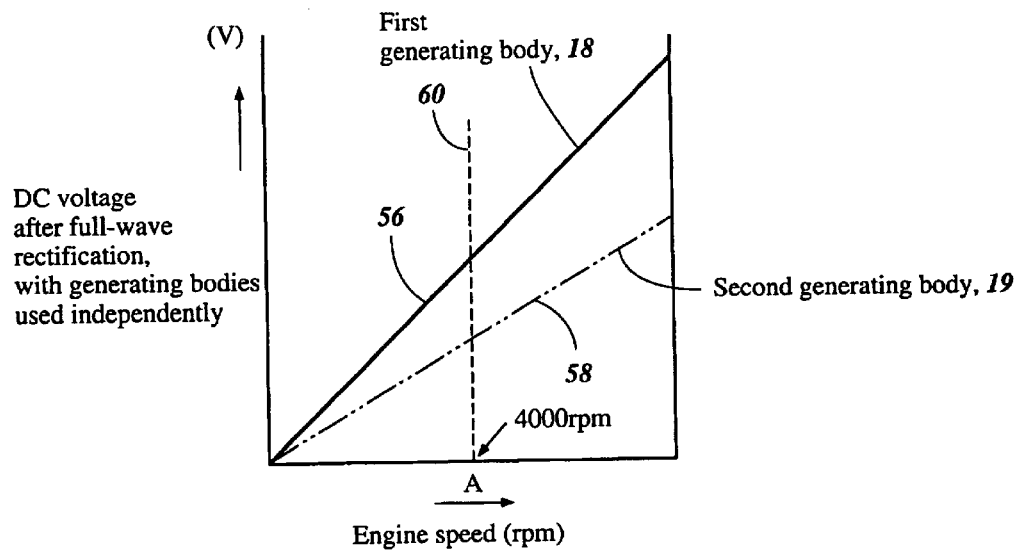
FIG. 6 is a graph of the DC voltage provided to the DC-to-AC converter as a function of an AC output current, which shows the voltage generated from the first generating body when operating independently and the voltage generated from the second generating body when operating independently.

The first generating body 18 and the second generating body 19 are constructed to generate AC voltages of different magnitudes at corresponding speeds. Since the rectified DC voltage produced at the output of the rectifier 46 increases as the AC voltage at the input increases, the rectified DC voltage increases with increasing engine speed, as illustrated in FIG. 6. In particular, as illustrated by a solid line 56 for the first generating body 18 and by a dash-dot line 58 for the second generating body 19, the first generating body 18 causes a greater rectified DC voltage than the second generating body 19 at any given engine speed. On the other hand, the second generating body 19 is able to generate a greater current than the first generating body 18 at any given voltage. The differences in the generation capabilities of the two generating bodies 18, 19 are used to provide the advantages described below.

Figure 7:
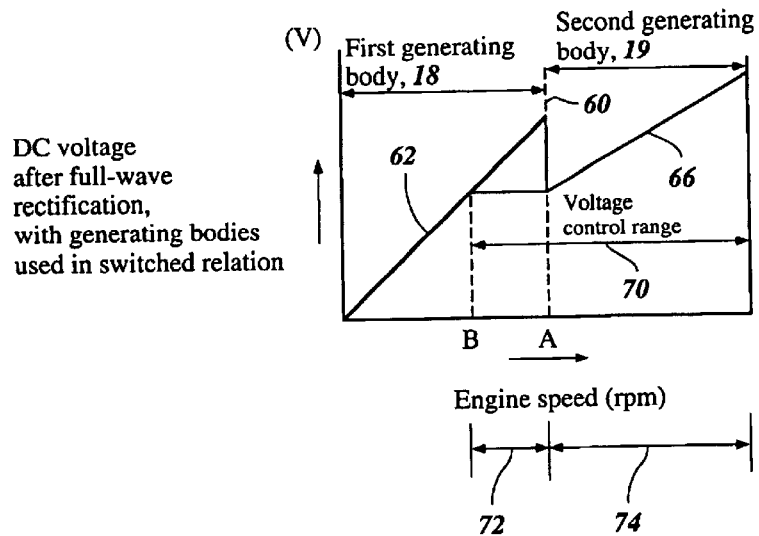
FIG. 7 is a graph of the combined DC voltage provided to the DC-to-AC converter as a function of an AC current when operation is switched from the first generating body to the second generating body.

As illustrated in FIG. 7, the DC voltage generated by the rectifier 46 needs to be at least at a minimum magnitude in order to assure the proper operation of the DC/AC converter 50. The engine speed that causes the first generating body 18 to generate an AC voltage that produces the minimum required rectified DC voltage is indicated as speed B in FIG. 7. At the speed B, the AC voltage generated by the second generating body 19 is too low to produce the minimum required rectified DC voltage.

As further illustrated in FIG. 7, at lower engine speeds below a certain speed A (e.g., below 4,000 rpm, as delineated by a vertical dashed line 60 in FIGS. 6 and 7), the AC voltage generated by the first generating body 18 is selected by the relay circuit 43 to deliver the AC input voltage to the rectifier 46 to produce the rectified DC voltage, as illustrated by a first sloped line 62 in FIG. 7. Because the first generating body 18 provides less current, it provides less power than the second generating body 19 would generate at the same AC voltage; however, the first generating body 18 generates any given voltage at a lower engine speed. Thus, for lower power requirements (e.g., below a selected current magnitude), the first generating body 18 is able to produce the required output power at a lower engine speed, thus, allowing the engine to run quieter, more economically, and less polluting than if the second generating body was producing the same power.

When additional power is required by the load (e.g., above the selected current magnitude), the ECU 20 can override the economy switch 26 to operate the engine at a higher speed to thereby increase the AC voltage and the power output from the first generating body 18, thus increasing the rectified DC voltage, as illustrated in FIG. 6 and in the left-hand portion of FIG. 7. If the economy switch 26 is in the off position, the ECU 20 advantageously runs the engine at a higher speed at all times.

When the engine speed increases to the certain speed A (e.g., 4,000 rpm), the relay circuit 43 is operated by the ECU 20 to select the AC voltage generated by the second generating body 19 instead of the AC voltage generated by the first generating body 18. The second generating body 19 generates a lower AC voltage than the first generating body 18 generates at the same speed. Thus, the resulting rectified DC voltage is lower at any given speed when the second generating body 19 is selected. For example, the rectified DC voltage caused by selecting the second generating body 19 at the speed A is approximately the same magnitude as the rectified DC voltage caused by the first generating body 18 at the lower speed B in FIG. 7. Thus, the AC voltage generated by the second generating body at the speed A is sufficient to cause the rectified DC voltage produced by the rectifier 46 to be at or above the minimum DC voltage required by the DC/AC converter 50.

Although the magnitude of the voltage generated by the second generating body 19 is less than the magnitude of the voltage generated by the first generating body 18 at the same speed, the second generating body 19 has a higher current capability at the same speed. Thus, the second generating body 19 produces at least the corresponding amount of power as the first generating body 18 at each speed. More importantly, the second generating body 19 generates increasing amounts of power as the engine speed is further increased but at lower resulting rectified DC voltages than if the power were produced by the first generating body 18. As illustrated by the right-hand portion of FIG. 6, the maximum rectified DC voltage caused by selecting the second generating body 19 at the maximum speed of the engine is much less than the maximum voltage that would be caused by selecting the first generating body 18 at the maximum speed.

As discussed above, the first generating body 18 can continue to produce additional power at engine speeds greater than the speed A; however, by switching to the second generating body 19 at engine speeds greater than the speed A, as illustrated in FIG. 7, the increased output power is produced at a much lower rectified DC voltage than the rectified DC voltage caused by the first generating body 18 at the same speeds. Thus, the maximum AC voltage applied to the input to the rectifier 46, is much lower than the voltage would be if the voltage from the first generating body 18 continued to be selected above. By limiting the AC voltage applied to the input of the rectifier 46 and thus limiting the rectified DC voltage produced by the rectifier 46, the thryistors, diodes and other components in the rectifier 46 can be selected to operate over a smaller voltage range. Thus, the rectifier 46 can be constructed using smaller and less costly components.

Similarly, since the rectified DC voltage produced by the rectifier 46 increases as the AC voltage input to the rectifier 46 increases, switching the AC voltage applied to the input of the rectifier 46 to the lower AC voltage from the second generating body 19 when the engine speed increases above 4,000 rpm reduces the maximum rectified DC voltage applied to the input of the DC/DC converter 50. Thus, the switching transistors and other components within the DC/DC converter 50 do not have to handle as a range of switching voltages as great as a range of switching voltages the components would have to handle if the full voltage range of voltages generated by the first generating body 18 over the same range of engine speeds was applied to the input of the rectifier 46.

As further illustrated in FIG. 7, a voltage control range 70 represents the range of engine speeds over which the rectified DC voltage generated by the rectifier 46 is within an acceptable operating range to be applied to the input of the DC/DC converter 50. A lower portion 72 of the voltage control range 70 starts at the speed B when the AC voltage generated by the first generating body 18 is selected as the input to the rectifier 46. The lower portion 72 of the range 70 continues to the speed A, at which speed the AC voltage generated by the second generating body 19 is selected as the input to the rectifier 46. The engine speeds from the speed A to the maximum operating speed of the engine which produces the maximum rectified DC voltage comprise an upper portion 74 of the voltage control range 70. The voltage control range 70 encompasses a greater range of engine speeds and a greater range of output powers than would be encompassed if only a single generating body was used to generate the AC voltage applied to the input of the rectifier 46.

Although the present invention has been described in terms of a certain preferred embodiments; other embodiments apparent to those of ordinary skill in the art also are within the scope of this invention. Thus, various changes and modifications may be made without departing from the spirit and scope of the invention. Moreover, not all of the features, aspects and advantages are necessarily required to practice the present invention. Accordingly, the scope of the present invention is intended to be defined only by the claims that follow.

What is claimed is:

1. An electrical generator system incorporating an internal combustion engine comprising:
- a first generating body driven by said internal combustion engine, said first generating body generating a first generated AC voltage that varies over a first predetermined voltage range when said internal combustion engine is operated at speeds within a first engine speed range;
- a second generating body driven by said internal combustion engine, said second generating body generating a second generated AC voltage that varies over a second predetermined voltage range when said internal combustion engine is operated at speeds within a second engine speed range;
- a relay circuit that receives said first generated AC voltage and said second generated AC voltages as inputs and that responds to a control signal to selectively provide one of said first and second generated AC voltages as a selected generated AC voltage;
- a rectification circuit that receives said selected generated AC voltage and that converts said selected generated AC voltage to a rectified DC voltage;
- a DC-to-AC converter that receives said rectified DC voltage and that converts said rectified DC voltage to an AC output voltage having a controlled voltage and controlled frequency; and
- a controller responsive to a detected speed of said internal combustion engine to generate said control signal to said relay circuit to cause said relay circuit to select said first generated AC voltage when said detected speed is within said first engine speed range and to select said second generated AC voltage when said detected speed is within said second engine speed range.

2. The electrical generator system as defined in claim 1, wherein said controlled frequency is 50 hertz.

3. The electrical generator system as defined in claim 1, wherein said controlled frequency is 60 hertz.

4. The electrical generator system as defined in claim 1, wherein said first engine speed range is below approximately 4000 rpm.

5. The electrical generator system as defined in claim 1, wherein said second engine speed range is above approximately 4000 rpm.

6. The electrical generator system as defined in claim 1, wherein said first generated AC voltage is greater than said second generated AC voltage at a selected engine speed.

7. The electrical generator system as defined in claim 1, wherein said second generating body is capable of generating more current than said second generating body at a selected voltage.

8. The electrical generator system as defines in claim 1, wherein a maximum engine speed within said second engine speed range is greater than a maximum speed within said first engine speed range, and wherein said relay circuit selects said second generated AC voltage when said internal combustion engine is operated within said second engine speed range.

9. An electrical generator system incorporating an internal combustion engine comprising:
- a computing device;
- a throttle that controls an operating speed of said internal combustion engine, said throttle being controlled by said computing device;
- a first generating body driven by said internal combustion engine, said first generating body generating a first generated AC voltage that varies over a first predetermined voltage range when said internal combustion engine is operated at speeds within a first engine speed range;
- a second generating body driven by said internal combustion engine, said second generating body generating a second generated AC voltage that varies over a second predetermined voltage range when said internal combustion engine is operated at speeds within a second engine speed range;
- a relay circuit that receives said first generated AC voltage and said second generated AC voltages as inputs and that responds to a control signal to selectively provide one of said first and second generated AC voltages as a selected generated AC voltage;
- a rectification circuit that receives said selected generated AC voltage and that converts said selected generated AC voltage to a rectified DC voltage;
- a DC-to-AC converter that receives said rectified DC voltage and that converts said rectified DC voltage to an AC output voltage having a controlled voltage and controlled frequency; and
- a current sensor that senses a magnitude of a current to a load connected to receive said AC output voltage and that provides an input signal to said computing device responsive to said magnitude of said current, said computing device responsive to said signal to control said throttle to operate said internal combustion engine at a speed within said first engine speed range when said magnitude of said current is below a selected current magnitude and to operate said internal combustion engine at a speed within said second engine speed range when said magnitude of said current is above a selected current magnitude.

10. The electrical generator system as defined in claim 9, wherein said relay circuit selects said second generated AC voltage when a predetermined high power load is present.

11. The electrical generator system as defined in claim 9, wherein said relay circuit selects said second generated AC voltage when a predetermined engine speed is present.

12. The electrical generator system as defined in claim 11, wherein said predetermined engine speed is approximately 4000 rpm.

13. The electrical generator system as defined in claim 9, wherein said controlled frequency is 50 hertz.

14. The electrical generator system as defined in claim 9, wherein said controlled frequency is 60 hertz.

* * * * *